(12) United States Patent
Chang

(10) Patent No.: US 9,534,808 B2
(45) Date of Patent: Jan. 3, 2017

(54) INFORMATION PUSHING DEVICE AND SMART VENTILATION APPARATUS

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/837,753

(22) Filed: Aug. 27, 2015

(65) Prior Publication Data

US 2016/0348937 A1 Dec. 1, 2016

(30) Foreign Application Priority Data

May 25, 2015 (CN) .......................... 2015 1 0269568

(51) Int. Cl.
*H01Q 11/12* (2006.01)
*F24F 12/00* (2006.01)
*H04B 1/04* (2006.01)

(52) U.S. Cl.
CPC ................. *F24F 12/00* (2013.01); *H04B 1/04* (2013.01)

(58) Field of Classification Search
CPC .................................. F24F 12/00; H04B 1/04
USPC ....................................................... 455/127.1
See application file for complete search history.

(56) References Cited

U.S. PATENT DOCUMENTS

2013/0159956 A1* 6/2013 Verghese ............ G06F 17/5036
716/122

* cited by examiner

*Primary Examiner* — Creighton Smith
(74) *Attorney, Agent, or Firm* — Zhigang Ma

(57) ABSTRACT

An information pushing device includes an information emitting device and a plurality of power generation members. The information pushing device is configured to push wireless information to mobile terminal equipments. Each power generation member includes a strip-shaped of electric generation film and two electrodes formed on two opposite surface of the electric generation film. The electric generation film is made from piezoelectric material, the power generation member comprises a first end and a second end opposite to the first end. The electrodes of the first end is electrically connected with the power supply unit, the second end swings under a cool or a heated airflow and produces charge. The charge is stored in the electrodes and provided to the information emitting device.

19 Claims, 4 Drawing Sheets

INFORMATION PUSHING DEVICE AND SMART VENTILATION APPARATUS

FIELD

The subject matter herein generally relates to internet technology, and particularly to an information pushing device and a smart ventilation apparatus.

BACKGROUND

Large venues, such as shopping malls, hospitals, factories or office buildings usually require air conditioning to output a cool airflow or heated airflow to adjust the indoor temperature, energy of the cool airflow or heated airflow is usually not fully utilized; and sometimes information about merchandise discounts, holiday activities information or service information, and so on also need to be displayed for users, and such information always displayed using advertising board, which leading to some consumers can not see the information in time.

Therefore, it is desirable to provide an information pushing device and a smart ventilation apparatus that can overcome the limitations described.

BRIEF DESCRIPTION OF THE DRAWINGS

Implementations of the present technology will now be described, by way of example only, with reference to the attached figures.

DETAILED DESCRIPTION

Figure 1:
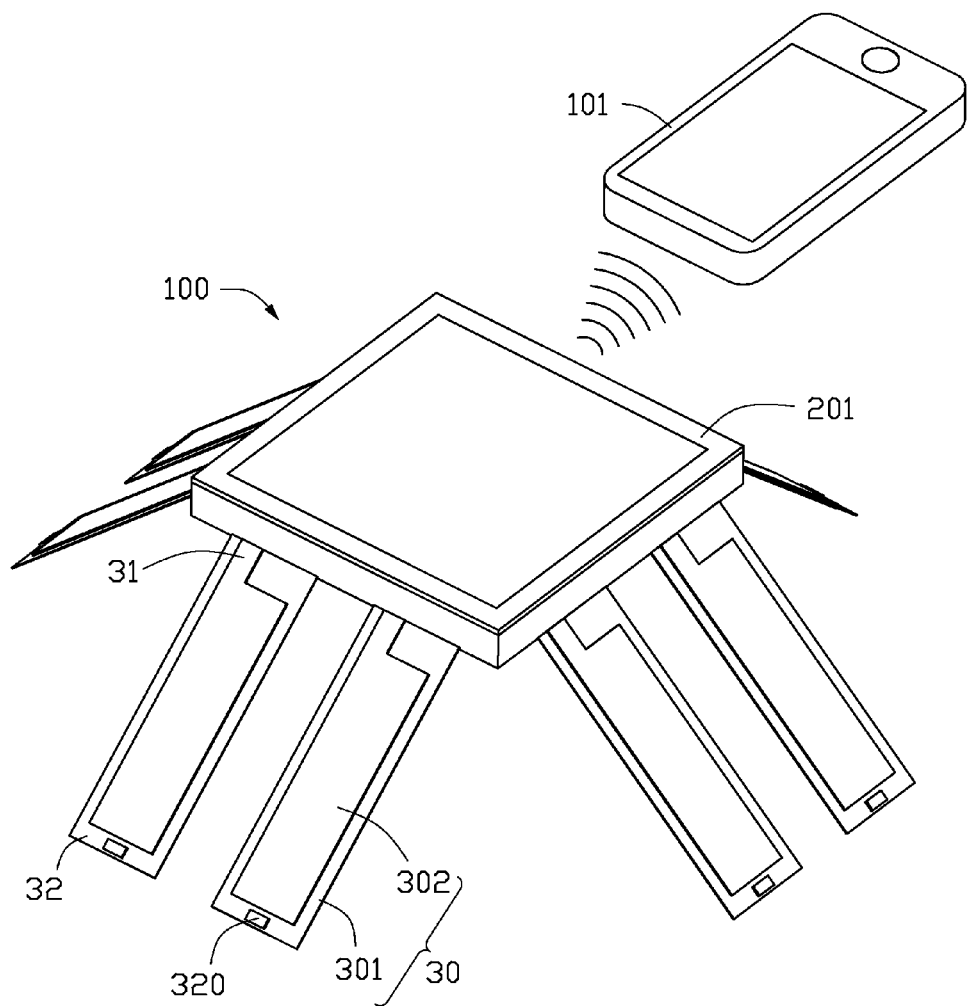
FIG. 1 is an isometric view of an information pushing device which includes an information emitting device in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates an information pushing device 100 according to a first embodiment. The information pushing device 100 includes an information emitting device 20, and a plurality of power generation members 30. The information pushing device 100 is mounted in public places with an air vent. The information pushing device 100 is used to push wireless information to mobile terminal equipment 101. The mobile terminal equipment includes but not limited to mobile phone, personal computer (PC), tablet, and so on. Wireless information includes but is not limited to promotional information, holiday activities information, public service information, and so on. The power generation members 30 use a stream of air in the vent to generate power, and the power is provided for the information pushing device 100.

Figure 2:
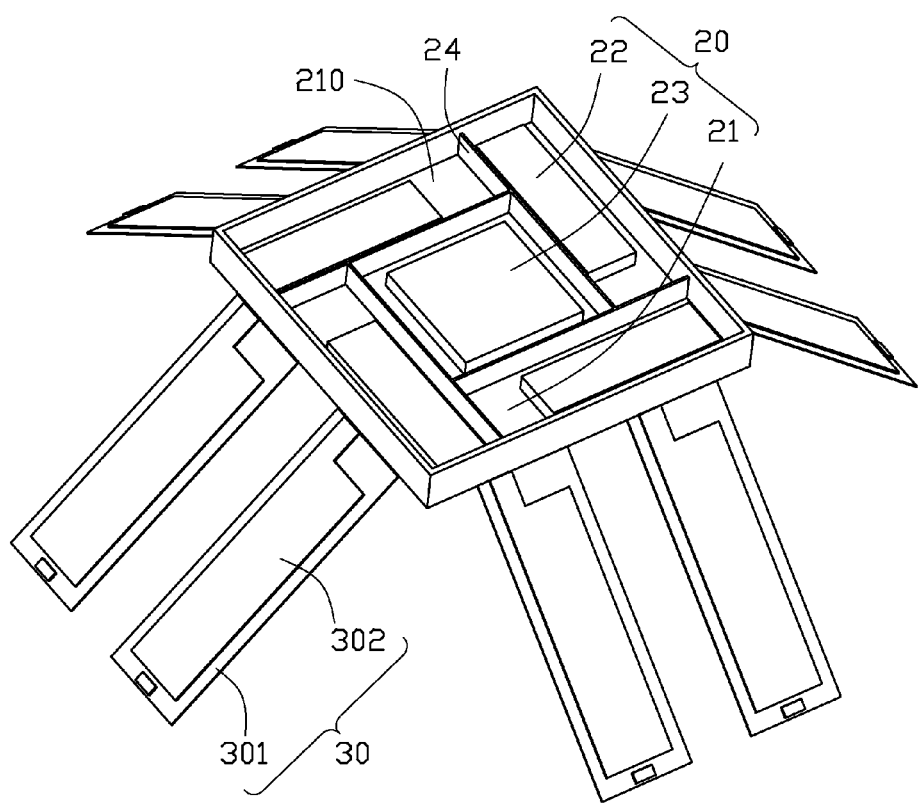
FIG. 2 is an internal structure of the information emitting device of FIG. 1.
Figure 3:
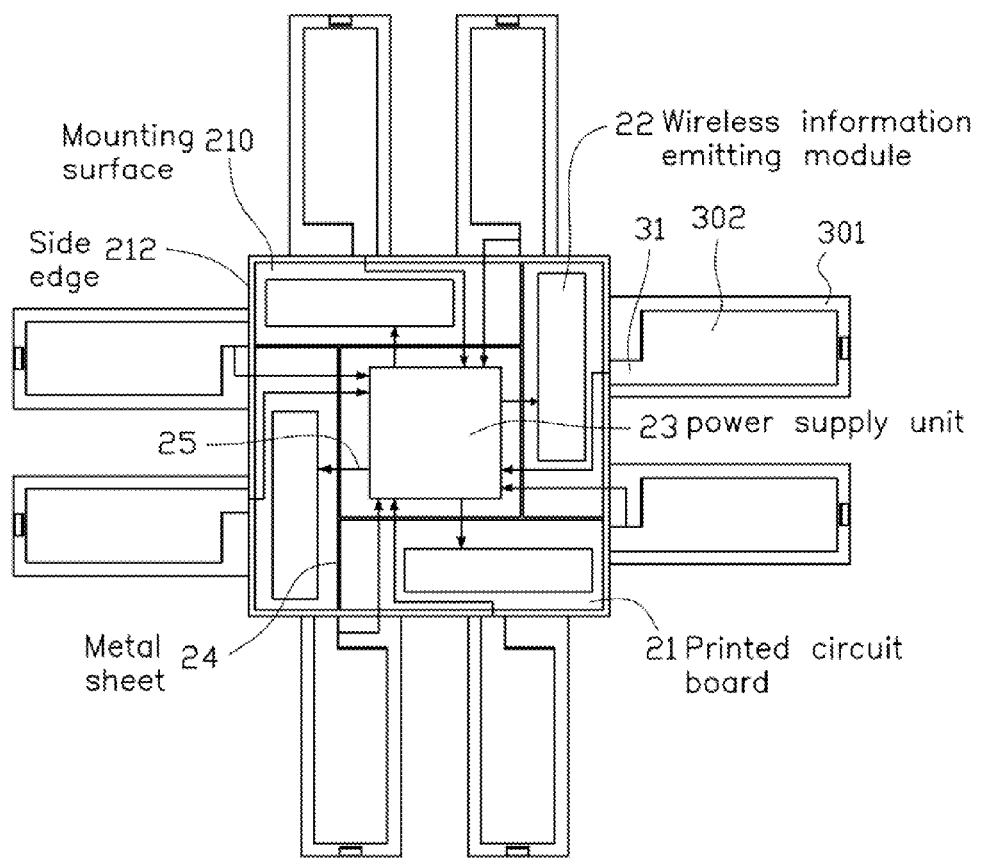
FIG. 3 is a topview of the information emitting device.

The information emitting device 20 is disposed in a plastic housing 201 and includes a printed circuit board 21, a power supply unit 23, and a plurality of wireless information emitting modules 22 which electrically connect with the power supply unit 21, as shown in FIG. 2 and FIG. 3.

The printed circuit board 21 is substantially cuboid and includes a mounting surface 210. The mounting surface 210 defines four side edges 212 perpendicularly connected with each other.

In the illustrated embodiment, the information emitting module 22 is a router and the numbers of the wireless information emitting modules 22 is four, each side edge 212 of the mounting surface 210 is arranged with a wireless information emitting module 22. Each wireless information emitting module 22 is able to emit same or different wireless information.

The four wireless information emitting modules 22 cooperatively form an area on the mounting surface 210, and the power supply unit 23 is disposed in the area. The power supply unit 23 is configured to collect a charge generated by the power generation members 30 and distribute the charge to the wireless information emitting modules 22.

In the illustrated embodiment, the information emitting device 20 further includes a plurality of metal sheets 24 arranged on the mounting surface 210, the metal sheet 24 is substantially L-shaped and configured to separate one of the wireless information emitting modules 22 from the other wireless information emitting modules 22, and therefore preventing signal interference between the wireless information emitting modules 22.

The power generation member 30 is electrically connected with the power supply unit 23 and configured to provide electric energy for the information emitting device 20. The number of the power generation members 30 are eight but not limited thereto, and may be increased or reduced in accordance with the actual needs in order to ensure that the information emitting device 20 can work normally.

Each power generation member 30 includes a strip-shaped electric generation film 301 and two electrodes 302 formed on two opposite surfaces of the electric generation film 301. The electric generation film 301 is made from piezoelectric material and a thickness of the electric generation film 301 is in a range about 20 um to 100 um. In the illustrated embodiment, the piezoelectric material is polymer piezoelectric material. In the illustrated embodiment, the polymer piezoelectric material is select from polyvinylidene fluoride (PVDF) or electro-active polymer (EAP). The electric generation film 301 is deformed under an external force and will generate the charge, the electrode 302 is used to collect the charge generated by the electric generation film 301.

The power generation member 30 includes a first end 31 and a second end 32 opposite to the first end 32, the electrodes 302 are arranged at the first end 31 and are electrically connected with the power supply unit 23 via wire 25. The second end 32 is provided with a scale 320 and the scale 320 may be a metal wafer, the scale 320 is configured to prevent the second end 32 from flowing too far away under a stream of air, in other words, the scale 320 can ensure the power generation member 30 stays in a certain range.

Figure 4:
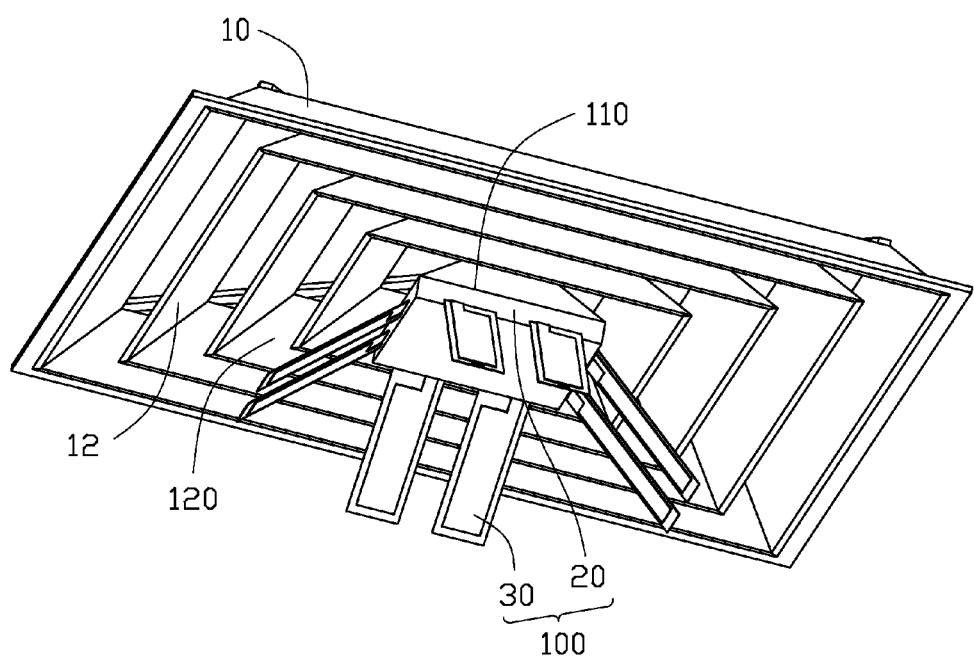
FIG. 4 is an isometric view of a smart ventilation apparatus in accordance with a second embodiment.

FIG. 4 illustrates a smart ventilation apparatus 200 according to a second embodiment. The smart ventilation apparatus 200 includes an ventilation device 10 and the information pushing device 100. The smart ventilation apparatus 200 can be embedded in a ceiling of a large active site, for example, hospitals, government units, shopping centers, and so on. The smart ventilation apparatus 200 is used for discharging cool or heated air flow from an air conditioner to adjust an indoor temperature, and can push information wirelessly to mobile terminals.

The ventilation device 10 is a ceiling ventilation fan and includes a group of square frames 12 arranged parallel to each other, each two adjacent square frames 12 form an vent 120, configured to output cool or heated air flow from an air conditioner. In the illustrated embodiment, the ventilation device 10 includes a central bottom end surface 110 securing the information pushing device 100.

When the smart ventilation apparatus 200 is in use, and when there is cool airflow or heated air flow discharging from the vent 120, the second end 32 of the power generation member 30 swings under the cool airflow or heated airflow, the swing of the second end 32 will deform the electric generation film 301 generating a charge; the charge is stored in the electrode 302, and supplied to the power supply unit 23, and the power supply unit 23 distributes the charge (electric power) to the four wireless information emitting modules 22, when mobile terminal equipment 101 is carried by users in these large public places, the mobile terminal equipment can be connected to the wireless information emitting module 22 via the wireless network, such as WiFi network, thus, mobile terminal equipment can receive the wireless information from the wireless information emitting module 22. In this way, the cool airflow or heated air flow discharged from an air conditioner can be converted into electric energy and utilized by the wireless information emitting module 22, in this way, public energy is saved.

The embodiments shown and described above are only examples. Therefore, many such details are neither shown nor described. Even through numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An information pushing device comprising:
    an information emitting device being configured to push wireless information to a mobile terminal equipment, and comprising a power supply unit; and
    a plurality of power generation members, each of the plurality of power generation members comprising a strip-shaped electric generation film made from piezoelectric material and two electrodes formed on two opposite surfaces of the electric generation film, and comprises a first end and a second end opposite to the first end, wherein electrodes mounted of the first end are electrically connected with the power supply unit, and the second end is configured to sway in response to an airflow and produce charge, and the electrodes mounted of the first end are configured to store and provide the charge to the information emitting device.

2. The information pushing device of claim 1, wherein the information emitting device comprises a printed circuit board and a plurality of wireless information emitting modules, both the power supply unit and the wireless information emitting modules are mounted on the printed circuit board.

3. The information pushing device of claim 2, wherein the printed circuit board is substantially cuboid and comprises a mounting surface defining four side edges perpendicularly connected with each other.

4. The information pushing device of claim 3, wherein the wireless information emitting module is a router and the number of the wireless information emitting modules is four, each side edge of the mounting surface is arranged with a wireless information emitting module.

5. The information pushing device of claim 4, wherein the four wireless information emitting modules cooperatively form an area on the mounting surface, and the power supply unit is disposed in the area, the power supply unit is configured to collect charge generated by the power generation member and distribute the charge to the wireless information emitting modules.

6. The information pushing device of claim 5, wherein the information emitting device further includes a plurality of metal sheets arranged on the mounting surface, the metal sheets are substantially L-shaped and configured to separate the wireless information emitting modules from each other.

7. The information pushing device of claim 6, wherein the electric generation film is made from polymer piezoelectric material.

8. The information pushing device of claim 7, wherein the polymer piezoelectric material is selected from polyvinylidene fluoride (PVDF) or Electro-active polymer (EAP).

9. The information pushing device of claim 8, wherein the second end of the power generation member is provided with a scale configured to limit swaying movement of the second end.

10. A smart ventilation apparatus comprising:
    an ventilation device being configured to output a cool or heated air flow;
    an information emitting device being configured to push wireless information to a mobile terminal equipment, and comprising a power supply unit; and
    a plurality of power generation members, each of the plurality of power generation modules comprising a strip-shaped electric generation film made from piezoelectric material and two electrodes formed on two opposite surfaces of the electric generation film, and comprises a first end and a second end opposite to the first end, electrodes mounted of the first end are electrically connected with the power supply unit, and the second end is configured to sway in response to an airflow and produce charge, and the electrodes mounted of the first end are configured to store and provide the charge to the information emitting device.

11. The smart ventilation apparatus of claim 10, wherein the ventilation device is a ceiling ventilation fan and comprises a bottom end surface at central thereof, the information emitting device is fixed to the bottom end surface.

12. The smart ventilation apparatus of claim 11, wherein the information emitting device comprises a printed circuit board and a plurality of wireless information emitting modules, both the power supply unit and the plurality of wireless information emitting modules are mounted on the printed circuit board.

13. The smart ventilation apparatus of claim 12, wherein the printed circuit board is substantially cuboid and comprises a mounting surface defining four side edges perpendicularly connected with each other.

14. The smart ventilation apparatus of claim 13, wherein the wireless information emitting module is a router and the number of the wireless information emitting modules is four, each side edge of the mounting surface is arranged with a wireless information emitting module.

15. The smart ventilation apparatus of claim 14, wherein the four wireless information emitting modules cooperatively form an area on the mounting surface, and the power supply unit is disposed in the area, the power supply unit is configured to collect charge generated by the power generation member and distribute the charge to the wireless information emitting modules.

16. The smart ventilation apparatus of claim 15, wherein the information emitting device further includes a plurality of metal sheets arranged on the mounting surface, the metal sheet is substantially L-shaped and configured to separate the wireless information emitting modules from each other.

17. The smart ventilation apparatus of claim 16, wherein the electric generation film is made from polymer piezoelectric material.

18. The smart ventilation apparatus of claim 17, wherein the polymer piezoelectric material is select from polyvinylidene fluoride (PVDF) or Electro-active polymer (EAP).

19. The smart ventilation apparatus of claim 17, wherein the second end of the power generation member is provided with a scale.

* * * * *